Feb. 3, 1948.   M. MALLORY   2,435,361
MULTIPLE PISTON ENGINE, OPPOSED, SEPARATE AIR AND FUEL SUPPLY
Filed Dec. 26, 1946   2 Sheets-Sheet 1
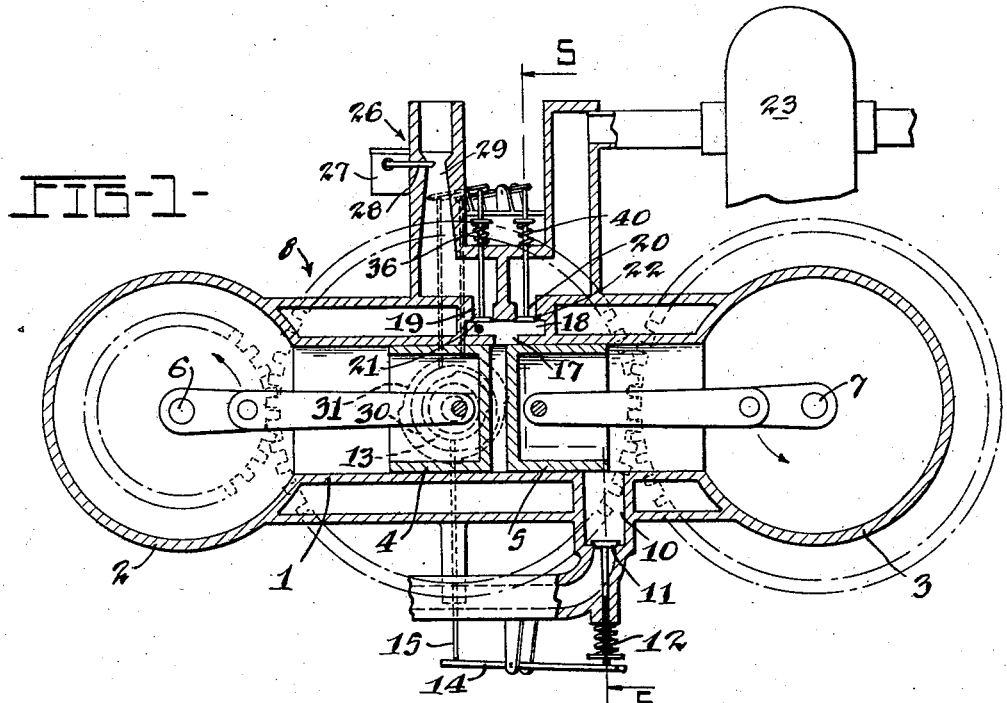
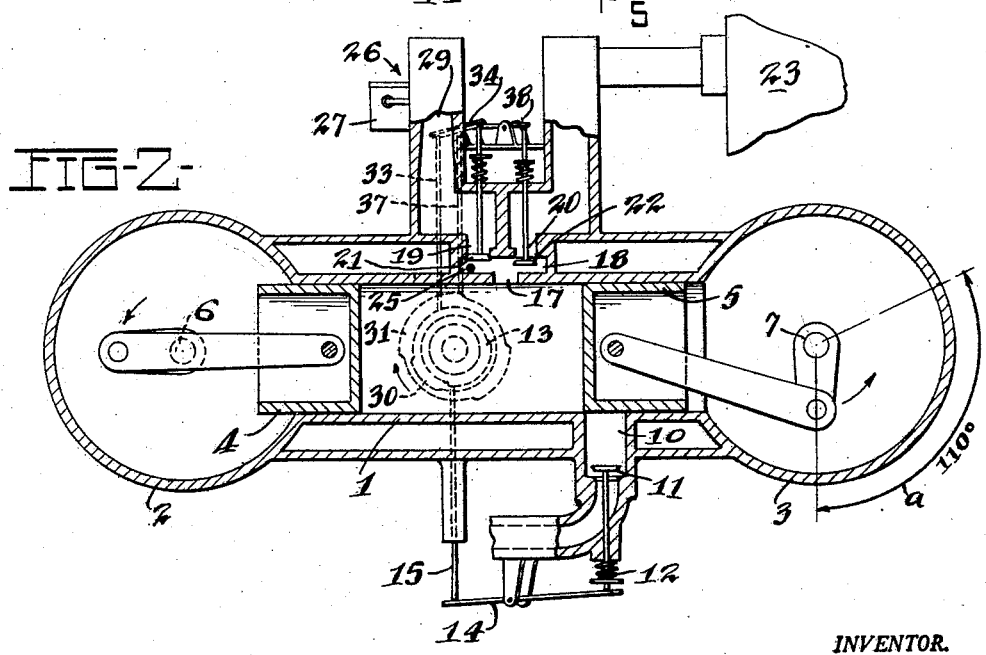
INVENTOR.
MARION MALLORY
BY
Owen & Owen,
ATTYS.

Feb. 3, 1948. M. MALLORY 2,435,361
MULTIPLE PISTON ENGINE, OPPOSED, SEPARATE AIR AND FUEL SUPPLY
Filed Dec. 26, 1946 2 Sheets-Sheet 2
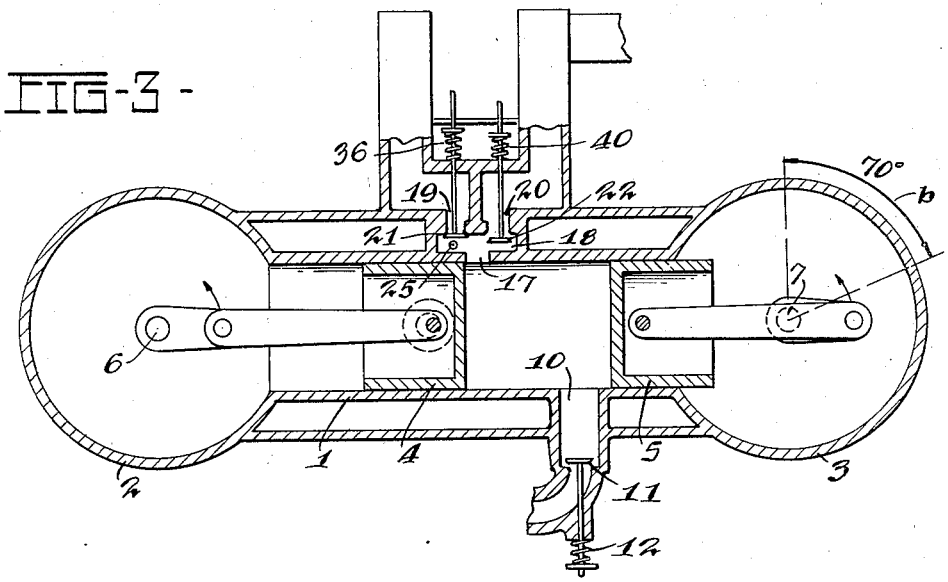
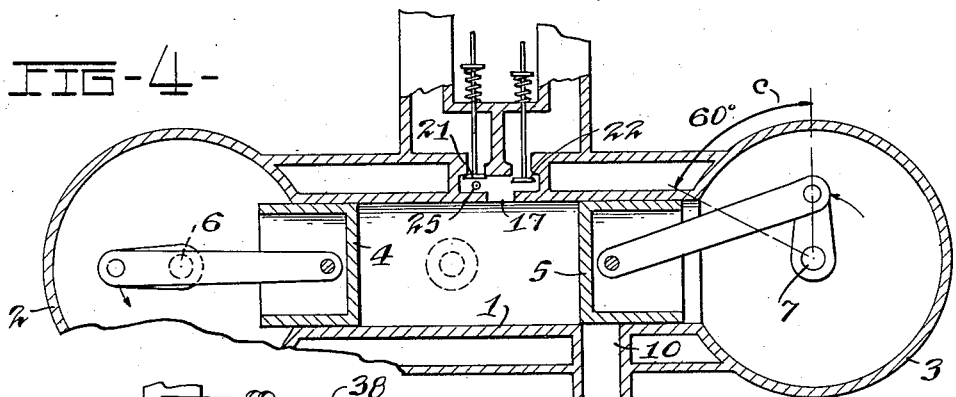
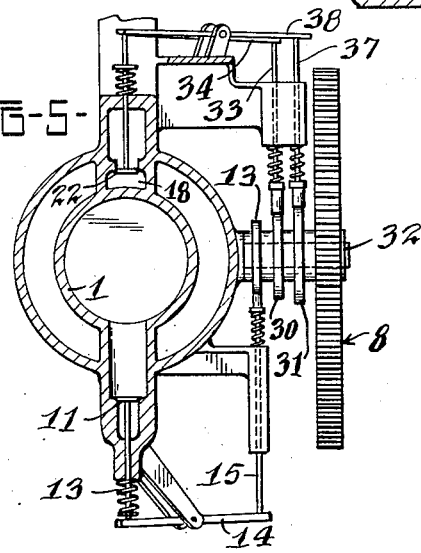
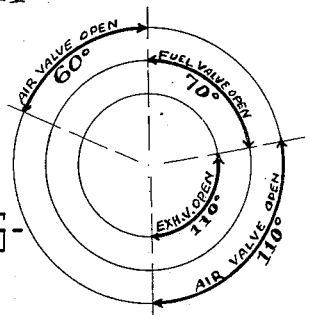
INVENTOR.
MARION MALLORY
BY
Owen & Owen,
ATTYS.

Patented Feb. 3, 1948

2,435,361

UNITED STATES PATENT OFFICE 2,435,361

MULTIPLE PISTON ENGINE, OPPOSED, SEPARATE AIR AND FUEL SUPPLY

Marion Mallory, Detroit, Mich.

Application December 26, 1946, Serial No. 718,479

5 Claims. (Cl. 123—51)

This invention relates to internal combustion engines of the type in which compression and combustion of the charges take place between two opposing pistons operating in a common cylinder and have their separate crankshafts connected to turn at different predetermined proportional speeds, one piston preferably completing two cycles while the other is completing one cycle.

An object of the invention is to so improve the operation of engines of this type by a co-ordination of the piston movements and opening and closing of fuel charge and exhaust valves that an ordinary suction type carburetor may be used for admitting fuel charges, instead of a pressure injection or blow carburetor, with highly efficient operating results, and more flexibility of control at low speeds and at idling.

Another object of the invention is to provide an arrangement and order of cooperative movements of the pistons and opening and closing of the fuel and air charge ports and the exhaust port that a substantially 90° mechanical exhaust stroke and a substantially 90° mechanical intake stroke are obtained, and that such exhaust stroke, augmented by the pressure of the charge, is sufficient to effect a highly efficient operation of the engine.

Further objects and advantages of the invention will be apparent from the following detailed description and from the accompanying drawings, in which Fig. 1 is a longitudinal section through an engine, showing the position of the parts at the beginning of a cycle, with both pistons in inner dead center position; Fig. 2 is a similar section, with parts omitted, showing the position of the movable parts when the slow piston has moved one-half of its outward stroke and is at the point where uncovering of the exhaust port begins; Fig. 3 is a similar section showing the position of the parts when the slow piston is in outer dead center position; Fig. 4 is a similar section showing the position of the parts when the slow piston has completed one-half of its in or return stroke; Fig. 5 is a section on the line 5—5 in Fig. 1, and Fig. 6 is a cam cycle diagram.

In the drawings, 1 designates an engine cylinder, the ends of which open into respective crank cases 2 and 3. Pistons 4 and 5 operate in opposite ends of the cylinder and are connected to the crank arms of respective crankshafts 6 and 7, the former in the case 2 and the latter in the case 3. The crank throws of both shafts, in the present instance, are of the same length, but this may be varied if desired. The crankshafts are connected in any suitable manner, as by a gear train 8, to have a turning ratio of two-to-one, so that shaft 6 makes two complete revolutions to one of the shaft 7. The shafts, in the present instance, are shown as turning in counterclockwise direction. The relationship of the connection of the two pistons with their shafts is such that at the start of a cycle both pistons are in dead center position at the inner ends of their strokes, as shown in Fig. 1.

The cylinder 1 has an exhaust port 10 that is uncovered by the slow piston 5 on its outstroke, and, in the present instance, is of such position and size that uncovering commences when the crank arm of the shaft 7 has turned approximately 90° from inner center position, as shown in Fig. 2, and remains uncovered until the crank has approximately reached its 270° position, as indicated in Fig. 4. The exhaust through the port 10 is further controlled by a valve 11, in the present instance, of the poppet-type that is timed to open an outlet passage approximately coincident with the initial uncovering of the port, or when the crank has turned approximately 90° from inner center position. The closing of the valve 11 is timed to take place when the crank has turned approximately 110° from said opening position, or is approximately 20° past outer dead center, as indicated in Fig. 2 by the line a. While the port 10, in the present instance, is opened slightly before and remains open slightly longer than the valve 11, this is not necessary. Also the times of opening and closing of the valve 11 may be changed to suit conditions, thus obtaining a longer or shorter power stroke. Thus, if the uncovering of the port 10 and opening of the valve 11 occurred at approximately 120° in the outstroke of piston 5, the powers or pressures in the cylinder would be of much longer duration and move piston 4 to approximately 140° past its outer center.

The exhaust valve 11 is normally closed by a spring 12 acting on the stem, and, in the present instance, has connection with and has properly timed opening movements imparted thereto by a cam 13 on the shaft 7. Said connection may comprise a rocker 14 acting at one end against the valve stem and at its other end against a tappet-rod 15 in engagement with the cam, as shown in Figs. 2 and 6.

The air and fuel charges are admitted to the cylinder 1 through a centrally located port 17 from a chamber 18 to which said charges are respectively admitted through ports 19 and 20 controlled by respective valves 21 and 22. The control of the air valve 22 is such that an air charge is admitted to the cylinder from a blower 23, or other suitable pressure source, throughout the movement of the crank 7 indicated by the line a in Fig. 2, or substantially so, and is again admitted during the last quarter movement of the crank, commencing at approximately the 270° point as indicated by the segmental line c in Fig. 4 to supply air to the fuel charge to support combustion.

The fuel valve is timed to start its opening approximately coincident with the closing of the exhaust valve or, in the present instance, at about 20° past outer dead center of the associated crankshaft 7 and to close approximately coincident with the second opening of the air valve, or at about 90° past outer dead center, as indicated by the heavy segmental line b in Fig. 3. Ignition preferably takes place in the fuel-receiving end of the chamber 18 by the sparking of a spark plug 25 therein, or it may be effected in any other suitable manner.

This causes combustion to take place in the portion of the chamber 18 in which the mixture is the richest. Fuel is preferably supplied to the port 19 from a suction type carburetor 26, of ordinary or any suitable construction, in which 27 indicates the fuel supply bowl and 28 the fuel feed tube leading therefrom to the Venturi portion of the carburetor passage 29.

The means illustrated for operating the two valves 21 and 22 at proper points in a cycle of operations comprises two cams 30 and 31, respectively, mounted on a shaft 32 (Fig. 5) of the center gear of the train 8, which gear turns at the same speed as the crankshaft 7. The cam 30 operates a push-rod 33 that is connected to and operates a lever 34 which in turn acts on the stem of the fuel valve 21 to impart an opening movement thereto against the tension of the valve spring 36. Likewise, the cam 31 operates a tappet-rod 37 connected to a lever 38 which acts on the stem of the air valve 22. This air valve is also normally retained in closed position by a spring 40.

In the operation of the engine, the ignition takes place preferably when the cranks have moved to a point slightly before or near dead center positions shown in Fig. 1, and the firing strokes of the pistons end when the slow crank 7 has turned approximately 90° and the fast crank 6 has turned 180°. At approximately these positions of the cranks the exhaust port 10 is starting to be uncovered by the piston 5, and both the exhaust valve 11 and the air valve 22 start to open. These valves continue open for approximately a 110° movement of the slow crank, or until it is about 20° past outer dead center, as indicated by the line a in Fig. 2, and the port 10 continues to remain open until the crank has approximately reached its 270° point, as shown in Fig. 4. The fuel valve 21 opens approximately simultaneously with the closing of the air and exhaust valves, or at about the 200° point of the slow crank and continues open for approximately 70° of movement of said crank, or until it has turned approximately 90° from outer dead center, such open period being indicated in Fig. 3 by the line b. Upon a closing of the fuel valve 21 the air valve 22 again opens for a duration indicated approximately by the line c in Fig. 4, or until the crankshaft has nearly reached its inner dead center position, thus permitting the admission of an air charge to the cylinder to mix with the fuel charge and support combustion.

In the ordinary four-cycle engine there is a mechanical intake stroke and also a mechanical exhaust stroke, each of 180°, and inasmuch as these operations are effected mechanically, it is not necessary to use outside pressures by blowers or otherwise to assist in charging and exhausting. In the ordinary two-cycle engine, however, both the exhausting and charging of the cylinder depend on external pumps or blowers. The pistons have nothing to do with such operations and about all the time there is to intake a charge is the 90° movement across the bottom dead center of the crank and piston.

With the present cooperative movements of the two pistons, both starting simultaneously at inner dead center position, or approximately so, and with the exhaust and the air and fuel inlet ports opening and closing as described, it is apparent that the piston 4 moves 180° on the exhaust stroke while the piston 5 moves 90° in the opposite direction, so that in reality there is only 90° of mechanical exhausting. Also it is clear by reference to Fig. 3 that piston 4 starts outwardly at approximately the time, or shortly before, the exhaust valve 11 closes, and that piston 5 moves toward the piston 4 on the intake stroke for about 90° during the 180° travel of piston 4, so that 90° must be subtracted from the intake stroke, thus leaving approximately 90° for mechanical intake.

The reason for using the exhaust valve 11 is that it is timed to open approximately when exhaust port 10 opens, but closes before such port is closed, so that the engine will have a 90° intake stroke. If it were not for the exhaust valve closing before the fast piston 4 starts on its outward stroke, the wide exhaust port would not be closed until piston 4 had reached the end of its outstroke, as shown in Fig. 4, and there would be a suck back through the exhaust passage and this would nullify the mechanical intake stroke action which takes place during a substantially full outward stroke of such piston, as indicated by the line b in Fig. 3.

It is apparent from the foregoing that the present engine actually has a 90° mechanical exhaust stroke and a 90° mechanical intake stroke of the slow piston 5, and as this is not enough for efficient operation the valve controlled air charge admission is utilized to assist the short mechanical exhaust stroke and the short mechanical instroke actions. For this reason the air valve is caused to open during the exhaust stroke to assist the mechanical stroke in scavenging, and after the mechanical intake stroke is completed the air valve is caused to again open for a short duration, as indicated in Fig. 4, to admit a compressed air charge and raise the cylinder pressure to compensate for the short intake stroke. During the outstroke of the fast piston 4 and the first half of the instroke of the piston 5, a rich fuel mixture is admitted to the cylinder from the carburetor, as indicated in Fig. 3, and this is diluted by air during the last half of the instroke of piston 5, as indicated in Fig. 4. While in the ordinary two-cycle engine very high charge pressures are required, necessitating approximately 100 per cent external pressure means for the purpose, in the present case a blower pressure of approximately 50 per cent for the air charge is augmented by a mechanical pressure of the engine of approximately 50 per cent, thus permitting a suction carburetor to be employed with the advantage of greater engine flexibility at low speeds and at idling, and of greater running efficiency.

I wish it understood that my invention is not limited to any specific construction, arrangement or form of the parts, or opening and closing of the valves and port 10, as it is capable of numerous modifications and changes without departing from the spirit of the claims.

Having thus described my invention, what I claim as new and desire to secure by United States Letters Patent is:

1. In an internal combustion engine having a cylinder in which two opposing pistons operate and between which combustion occurs, said pistons being connected at opposite ends of the cylinder to separate crankshafts connected together with a two-to-one ratio and to start a cycle with both pistons in inner dead center positions, and a broad exhaust port having a relatively restricted outlet and located to be uncovered by the slow piston during approximately the last half of its outstroke and a portion of its instroke, a valve controlling the exhaust from said port, means operable to open said valve approximately coincident with the initial uncovering of said port and to close it after the slow piston has commenced its instroke, means for admitting fuel charges to the cylinder near its center including a suction carburetor and a normally closed admission valve, valve controlled means for admitting air charges under pressure to the cylinder near its center, means operable to open the air charge valve first during at least a portion of the exhaust period and later during a portion at least of the last half of the slow piston instroke, and means operable to open the fuel charge means valve during a substantial portion of the first half of the slow piston instroke.

2. In an internal combustion engine having a cylinder in which two opposing pistons operate and between which combustion occurs, said pistons being connected at opposite ends of the cylinder to separate crankshafts connected together with a two-to-one ratio and to start a cycle with both pistons in inner dead center positions, and an exhaust port located and of a size to be uncovered by the slow piston during substantially the entire last half of its outstroke and for substantially the first half of its instroke, a valve controlling the exhaust from said port, means operable to open said valve approximately coincident with the initial uncovering of the port and to close it a short distance after the slow piston has commenced its instroke, means for admitting fuel charges to the cylinder near its center including a suction carburetor and a normally closed admission valve, valve controlled means for admitting air charges under pressure to the cylinder near its center, means operable to open the air charge valve substantially coincident with the uncovering of said exhaust port and to continue it open until the slow piston has started on its instroke to again open such valve and continue it open during a portion at least of the last quarter movement of the slow piston crankshaft, and means operable to open the fuel charge means valve and to continue it open for a predetermined period intermediate the first and second air charge periods.

3. In an internal combustion engine having a cylinder in which two opposing pistons operate and between which combustion occurs, said pistons being connected at opposite ends of the cylinder to separate crankshafts connected together with a two-to-one ratio and to start a cycle with both pistons in inner dead center positions, and an exhaust port located to be uncovered by the slow piston during the last half of its outstroke and the first half of its instroke, a normally closed valve controlling the exhaust from said port, means operable to open said valve approximately coincident with the initial uncovering of the port and to close it after the slow piston has moved a short distance on its instroke, means for admitting fuel charges to the cylinder near its center including a suction carburetor and a normally closed admission valve, valve controlled means for admitting air charges under pressure to the cylinder near its center, means operable to open the air charge valve for a predetermined portion of the exhaust period and later during the last half of the slow piston instroke movement, and means operable to open the fuel charge means valve during approximately a 70° instroke movement of the slow piston after a closing of the exhaust by said valve controlled means.

4. In an internal combustion engine having a cylinder in which two opposing pistons operate and between which combustion occurs, said pistons being connected at opposite ends to the cylinder to separate crankshafts connected together with a two-to-one ratio and to start a cycle with both pistons in inner dead center positions, and an exhaust port located to be uncovered by the slow piston for substantially 180° commencing at approximately 90° past inner dead center position, a valve controlling the exhaust from said port, means operable to open said valve approximately at the beginning of the second quarter movement of the slow piston crank from inner dead center position and to continue it open until the crank has moved approximately 20° past its outer dead center position, means for admitting fuel charges to the cylinder near its center including a normally closed admission valve, valve controlled means for admitting air charges under pressure to the cylinder near its center, means operable to open the air charge valve first during and continuing throughout the exhaust period and later during the last half of the slow piston instroke, and means operable to open the fuel charge means valve immediately after a closing of the exhaust and air charge valves and for approximately a 70° movement of the slow piston on its instroke.

5. In an internal combustion engine having a cylinder in which two opposing pistons operate and between which combustion occurs, said pistons being connected at opposite ends of the cylinder to separate crankshafts geared together with a two-to-one ratio and to start a cycle with both pistons in inner dead center positions, and an exhaust port located to be uncovered by the slow piston for substantially the entire last half of its outstroke and for a portion of its instroke, a valve controlling the exhaust from said port, means operable to open said valve approximately coincident with the initial uncovering of said port and to close it after the slow piston has commenced its instroke and before the port is covered by the piston on such instroke, means operable to admit an air pressure charge to the cylinder between the pistons during substantially the entire period that said exhaust valve is open and to later admit a second charge of air pressure during the last portion of the slow piston instroke, and means operable to introduce a fuel charge to the cylinder between the pistons between said air charge periods.

MARION MALLORY.

REFERENCES CITED

The following references are of record in the file of this patent:

UNITED STATES PATENTS

| Number | Name | Date |
|---|---|---|
| 981,753 | Fowler | Jan. 17, 1911 |
| 1,237,696 | Rayl | Aug. 21, 1917 |